Nov. 29, 1927.

R. M. CRAVENS 1,650,610

RESILIENT VEHICLE WHEEL

Filed March 9, 1926

INVENTOR.
Ridgway M. Cravens
BY
ATTORNEYS.

Patented Nov. 29, 1927.

1,650,610

UNITED STATES PATENT OFFICE.

RIDGWAY M. CRAVENS, OF BROOKLYN, NEW YORK.

RESILIENT VEHICLE WHEEL.

Application filed March 9, 1926. Serial No. 93,440.

This invention is a resilient wheel, and, more particularly, a resilient disk wheel for motor vehicles.

The object of the invention is to provide a simple and highly efficient vehicle wheel of the disc type which may be used in conjunction with either pneumatic or solid tires and which, by virtue of its own inherent resiliency will absorb road shocks and vibration without relying upon the resiliency of the tire in the fulfillment of its function.

The wheel of this invention is unusually simple in construction, but, in practice, it is highly efficient in the performance of its intended functions. The parts are such that they will not be apt to get out of order and the wheel will function indefinitely in a thoroughly efficient, practical and economical manner.

Features of the invention, other than those specified, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1:
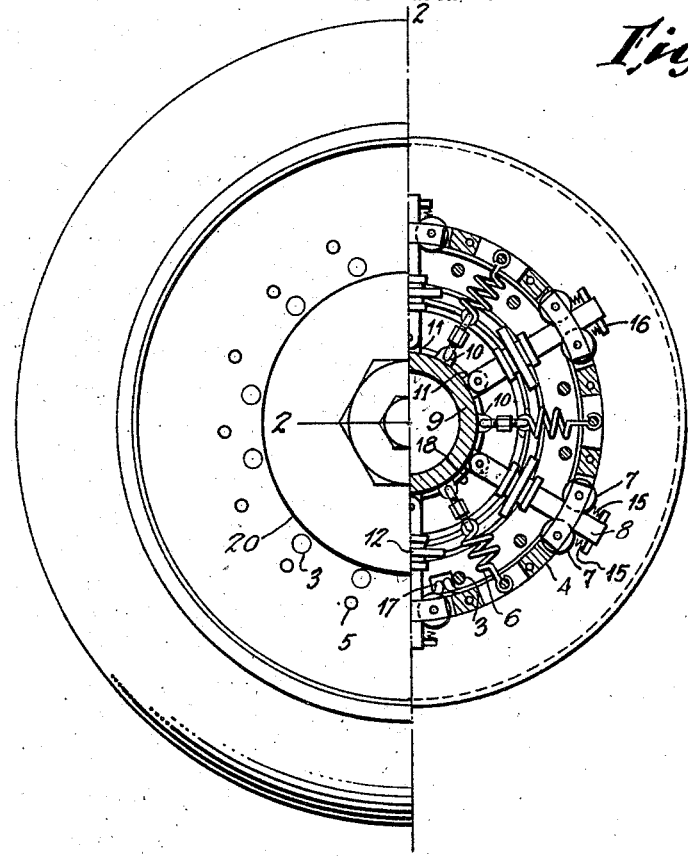
Figure 1 shows the wheel of the present invention partly in side elevation and partly in section. In the sectional part of this view, the tire, rim and the two disks on the near side of the wheel are removed and the sleeve shown in section.

Referring to the drawings, 1 designates the rim of the wheel which may be adapted to carry either a solid or pneumatic tire. To the inner periphery of this rim is secured two annular disks 2 secured together adjacent their inner peripheries by bolts or other suitable tie members 3. Between these disks is positioned a ring 4 which is rigidly secured to the disks by bolts or rivets 5, which extend through both disks and through the interposed ring. The ring 4 is provided at spaced distances with openings. In the alternate openings, the outer ends of a plurality of helical springs 6 are anchored on the juxtaposed bolts 5, while in the intermediate openings antifriction rollers 7 are mounted in spaced relation to permit spokes 8 to pass between said rollers to be guided thereby.

A sleeve 9 is adapted to encircle any conventional hub and to be keyed or otherwise secured thereto against rotation on the hub. The outer periphery of the sleeve is provided with lugs 10 and interspaced lugs 11. To each of the lugs 10 is secured one end of a turn buckle while the other end of the turnbuckle is secured to the inner end of one of the springs 6, so that through the manipulation of the turn buckles the spring 6 may be tensioned to properly support the sleeve 9 from the rim.

The lugs 11 are pivotally secured to the inner ends of the spokes 8. These spokes are preferably in the form of rigid cylindrical rods extending in an outward radial direction from the sleeve and guided for longitudinal movement by the rollers 7.

Figure 2:
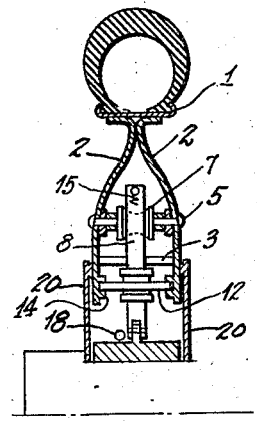
Figure 2 is a section on the line 2—2 of Figure 1.
Figures 3, 4:
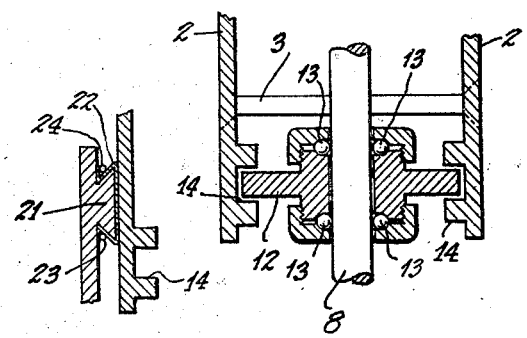
Figure 3 is an enlarged detail section showing the manner in which the annular and supplemental disks engage one another; and, Figure 4 is a similar section showing the spoke and roller assembly.

Mounted on each of the spokes 8 between the ring 4 and the sleeve 9 is a roller 12. This roller is adapted for simultaneous rotation and longitudinal movement with respect to the spoke on which it is mounted and in order to minimize friction, the parts are preferably assembled, as shown in Fig. 4, and embody antifriction bearings 13, which permit such sliding and rotary movement with minimum friction. Each of the rollers 12 rotates in a plane perpendicular to the spoke on which it is mounted and is guided for such rotation within guides 14 formed on the inner peripheries of the annular disks 2, as illustrated in Figures 2 and 4. These guides limit the movement of the rollers to rotation while permitting the spokes to freely slide through the rollers. The function of the rollers 12 is to efficiently brace the wheel structure against lateral stresses and to accomplish this result with minimum friction and consequent minimum wear.

The hub is supported from the rim by the springs 6 which are tension springs, while the wheel parts are maintained in proper operative relation by the spokes. The function of supporting the wheel against lateral thrusts and stresses has been referred to, but these spokes have the further function of precluding the hub from running away from the rim and vice versa. The spokes are rendered capable of performing this function by the interposition of the bolts or tie members 3, which will permit of only limited pivotal movement of the spokes before said spokes engage with said tie members. It will of course be understood that the springs 6 will operate to urge the spokes into radial positions, but when the wheel is driven or braked, the springs will be insufficient and the engagement of the spokes with the tie members is availed of.

Small compression springs 15 are preferably associated with the outer ends of the spokes and are adapted to engage with the ring or rollers to cushion the wheel against rebound or when the wheel is subjected to severe road shocks. These cushioning springs together with the bracket 16, by which they are mounted on the spokes further prevent the spokes from being retracted so far as to be disengaged from the guide rollers 7.

In practice, the parts are lubricated by a tube running along the inner surface of the ring 4 and the outer surface of the sleeve 9. The tube for lubricating the parts associated with the ring is designated 17, while the tube for lubricating the parts associated with the sleeve is designated 18. Small ducts lead from these tubes to the points of attachment of the moving parts and the ends of the tubes are juxtaposed with openings in the disks whereby grease or oil may be introduced into said tubes and thus fed to the moving parts.

In order to cover and conceal the opening between the inner peripheries of the annular disks 2 and the hub, supplemental disks 20 are provided. These disks are of such size that they will overlap the annular disks after the manner shown in Figure 2. In order to minimize friction and preclude rubbing away where these disks overlap, the inner disks are preferably provided near their outer periphery and at their inner faces with annular ribs 21 of substantially dovetail cross section and these ribs are faced with leather, rubber or other suitable material 22 held in place by spring rings 23 and 24, which are sprung into engagement with the inner and outer peripheries to each rib, as clearly shown in Figure 3.

The disks are secured to the hub or sleeve in any suitable manner to cause the ribs of the supplemental disks to be maintained at all times against the annular disks.

It will be apparent from the structure which I have described that the hub is not rigidly secured to the rim of the wheel, but that, in contradistinction, these parts are adapted for limited relative rotation. This is of advantage, since such relative movement is of a cushioned or yielding character and not only produces more flexible braking, but also eliminates undue strains occasioned by uneven transmission of power from the prime mover of the vehicle. Even though the transmission of power be unsteady, the fluctuations thereof will be, in effect, smoothed out while being transmitted from the hub to the rim of the wheel as described.

The foregoing detailed description sets forth the preferred practical form of the invention, but the invention is to be understood as fully commensurate with the appended claims.

Having thus fully described the invention, what I claim as new and desire to secure by Letters Patent is:

1. A resilient wheel embodying a hub, a rim, a plurality of spokes pivotally associated with the hub and extending in an outward radial direction, a plurality of springs also pivotally secured with respect to the hub and extending in an outward radial direction, a ring to which the outer ends of said springs are secured, said ring being provided with openings through which the spokes project, disks extending inwardly from the rim at both sides of the ring and rigidly secured to said ring, and means for precluding pivotal movement of the spokes with respect to the hub beyond predetermined limits.

2. A resilient wheel embodying a hub, a rim, a plurality of spokes pivotally associated with the hub and extending in an outward radial direction, a plurality of springs also pivotally secured with respect to the hub and extending in an outward radial direction, a ring to which the outer ends of said springs are secured, said ring being provided with openings through which the spokes project, annular disks secured to the rim and extending inwardly and enclosing said ring, means for rigidly securing the ring to both disks, guides carried by said disks on their inner faces and near their inner margins, and rollers carried by the spokes and engaging with said guides.

3. A resilient wheel embodying a hub, a rim, a plurality of spokes pivotally associated with the hub and extending in an outward radial direction, a plurality of springs also pivotally secured with respect to the hub and extending in an outward radial direction, a ring to which the outer ends of said springs are secured, said ring being provided with openings through which the spokes project disks extending radially inward from the rim at both sides of the ring and provided near their inner peripheries with guides, means for rigidly securing the ring to said disks, rollers mounted on the spokes and cooperating with the guides of said disks, and supplemental disks associated with the hub for closing the space between the inner peripheries of the disks and said hub, said supplemental disks being provided with annular ribs faced with non-metallic material to bear against the outer faces of the annular disks, and means for limiting the pivotal movement of the spokes within predetermined limits.

RIDGWAY M. CRAVENS.